United States Patent
Harris et al.

(10) Patent No.: US 9,413,821 B2
(45) Date of Patent: Aug. 9, 2016

(54) METHOD FOR ALLOWING DEVICES TO INTERACT WITH EACH OTHER IN A USER-DETERMINED MANNER

(71) Applicant: Qualcomm iSkoot, Inc., San Diego, CA (US)

(72) Inventors: Sarah Harris, Jerusalem (IL); Isaac David Guedalia, Bet Shemesh (IL)

(73) Assignee: QUALCOMM CONNECTED EXPERIENCES, INC., San Diego, CA (US)

( * ) Notice: Subject to any disclaimer, the term of this patent is extended or adjusted under 35 U.S.C. 154(b) by 386 days.

(21) Appl. No.: 13/764,599

(22) Filed: Feb. 11, 2013

(65) Prior Publication Data

US 2014/0226529 A1     Aug. 14, 2014

(51) Int. Cl.
| | |
|---|---|
| *H04W 84/18* | (2009.01) |
| *H04L 29/08* | (2006.01) |
| *H04W 8/00* | (2009.01) |
| *H04W 8/22* | (2009.01) |

(52) U.S. Cl.
CPC .......... *H04L 67/1061* (2013.01); *H04L 67/303* (2013.01); *H04W 8/005* (2013.01); *H04W 8/22* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,737,353 B2 | 6/2010 | Sasaki et al. | |
| 7,771,320 B2 | 8/2010 | Riley et al. | |
| 7,811,201 B1 | 10/2010 | Mikan et al. | |
| 8,782,121 B1 * | 7/2014 | Chang | 709/202 |
| 2005/0114493 A1 * | 5/2005 | Mandato et al. | 709/223 |
| 2006/0140499 A1 * | 6/2006 | Kang | H04N 5/765 382/254 |
| 2006/0149850 A1 * | 7/2006 | Bowman | 709/231 |
| 2006/0239190 A1 | 10/2006 | Kumar et al. | |
| 2008/0062945 A1 * | 3/2008 | Ahuja | H04W 8/005 370/342 |
| 2008/0247371 A1 * | 10/2008 | Kwon et al. | 370/338 |
| 2009/0281865 A1 * | 11/2009 | Stoitsev | 705/9 |
| 2009/0327395 A1 | 12/2009 | Park et al. | |
| 2011/0274084 A1 * | 11/2011 | Chu et al. | 370/331 |
| 2011/0281566 A1 | 11/2011 | Davis et al. | |
| 2012/0011247 A1 | 1/2012 | Mallik et al. | |
| 2012/0155443 A1 * | 6/2012 | Cordeiro | 370/338 |
| 2012/0260302 A1 | 10/2012 | Harris | |
| 2013/0021535 A1 * | 1/2013 | Kim et al. | 348/738 |

FOREIGN PATENT DOCUMENTS

| | | |
|---|---|---|
| EP | 1526457 A1 | 4/2005 |
| WO | 2012006446 | 1/2012 |

OTHER PUBLICATIONS

International Search Report and Written Opinion—PCT/US2014/015624—ISA/EPO—May 19, 2014.
Taiwan Search Report—TW103104464—TIPO—Oct. 21, 2015.

* cited by examiner

*Primary Examiner* — Hassan Phillips
*Assistant Examiner* — Gautam Sharma
(74) *Attorney, Agent, or Firm* — Muncy, Geissler, Olds & Lowe, P.C.

(57) ABSTRACT

The disclosure is directed to operating a first device configured to communicate with one or more other devices. An aspect discovers the one or more other devices, wherein the first device and the one or more other devices form a device network, monitors one or more conditions associated with the device network to identify a triggering condition that occurs within the device network, wherein the triggering condition is associated with one or more actions to be performed by the device network, detects an occurrence of the triggering condition, and in response, performs an action associated with the triggering condition.

38 Claims, 8 Drawing Sheets

METHOD FOR ALLOWING DEVICES TO INTERACT WITH EACH OTHER IN A USER-DETERMINED MANNER

BACKGROUND OF THE INVENTION

1. Field of the Invention

The disclosure is directed to a method for allowing devices to interact with each other in a user-determined (rather than programmer determined) manner.

2. Description of the Related Art

User devices, such as cell phones, smart phones, tablet computers, personal computers, laptops, smart televisions, personal digital assistants, and the like, are increasingly able to interact with each other. User devices may communicate with each other on a peer-to-peer basis over a common local area network. For example, a smart phone, a smart television, and a tablet computer may communicate with each other on a user's home Wi-Fi network. Alternatively, user devices connected to different networks may communicate with each other via a server with access to each of the different networks.

Currently, interactions between user devices are constrained by the limitations set by programmers. Typically, in order for user devices to communicate with each other, the user devices typically must have applications developed by the same programmer installed. A user might want to have two user devices communicate, but because they do not both have a specific application installed, the user devices are only able to perform a limited set of actions. Similarly, a user will often want to do something with an existing application that is different from its capabilities in some way.

There are numerous examples of user devices interacting in a strictly predetermined manner. For example, two user devices can transfer files over Bluetooth when both devices have a Bluetooth file sharing application installed. As another example, a number of users can play the same game on their respective user devices when each user device has the same game installed and the same communication abilities. As yet another example, a video can be streamed from a smart phone to a smart television when both devices have been explicitly programmed to support this interaction.

Accordingly, it would be beneficial to allow user devices to interact with each other in a user-determined (rather than programmer-determined) manner.

SUMMARY

The disclosure is directed to operating a first device configured to communicate with one or more other devices. An aspect discovers the one or more other devices, wherein the first device and the one or more other devices form a device network, monitors one or more conditions associated with the device network to identify a triggering condition that occurs within the device network, wherein the triggering condition is associated with one or more actions to be performed by the device network, detects an occurrence of the triggering condition, and in response, performs an action associated with the triggering condition.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
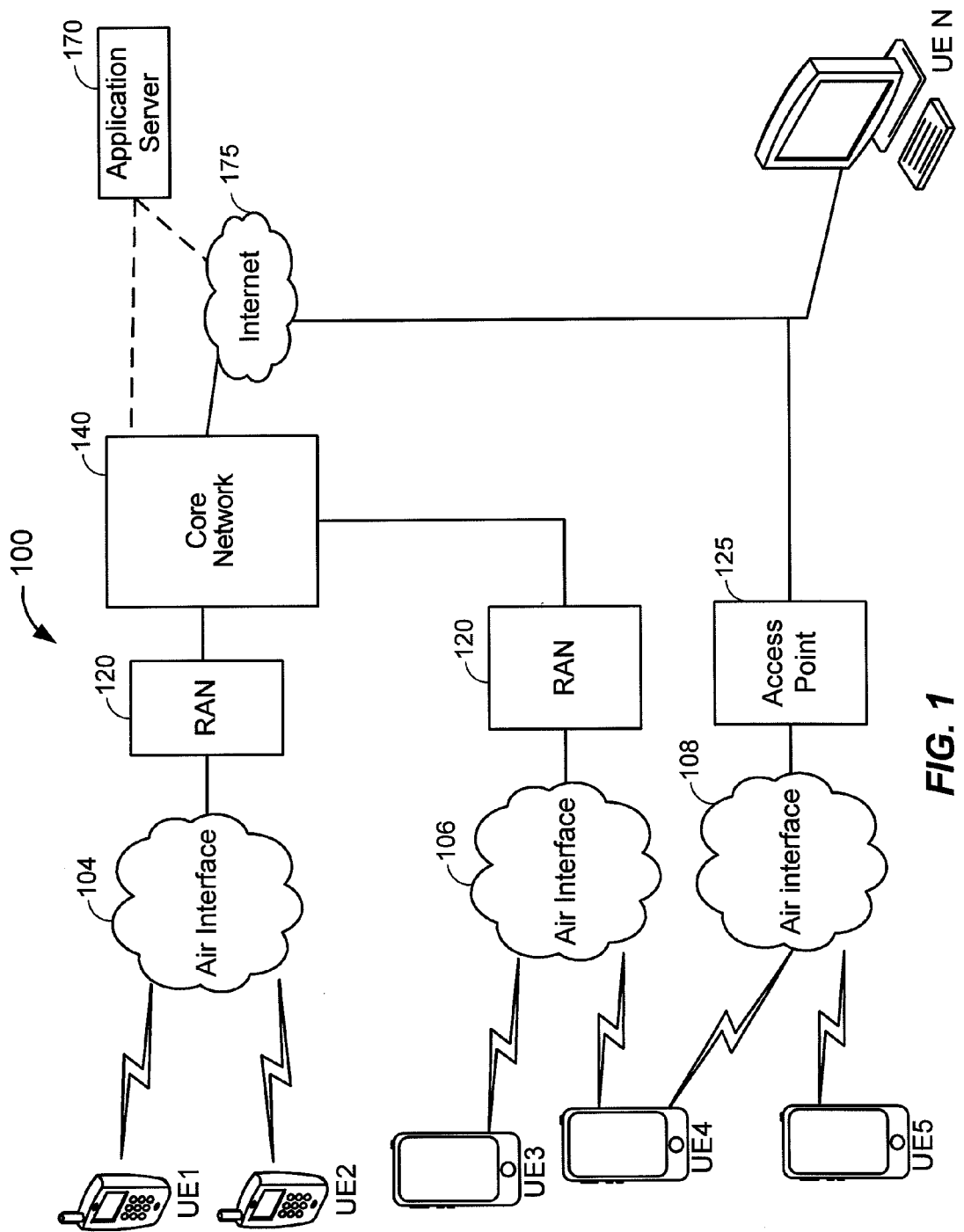
FIG. 1 illustrates a high-level system architecture of a wireless communications system in accordance with an aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Enhanced High Rate Packet Data (eHRPD), Global System of Mobile Communication (GSM), Enhanced Data Rates for GSM Evolution (EDGE), Wideband CDMA (W-CDMA), Long-Term Evolution (LTE), etc.), while the air interface 108 can be a wireless local area network (WLAN) that complies with a wireless IP protocol (e.g., IEEE 802.11), such as a Wi-Fi network. The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Figure 2:
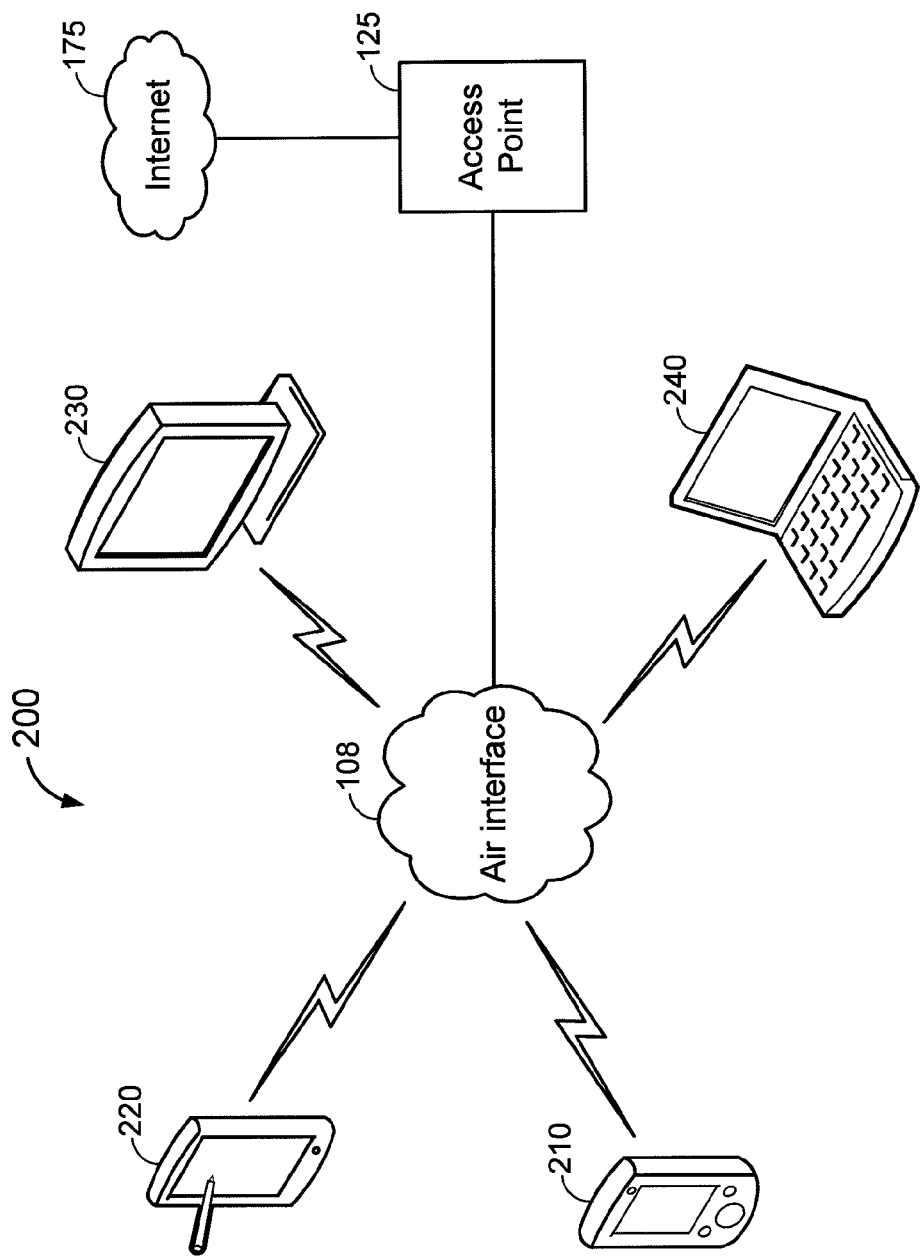
FIG. 2 illustrates a high-level system architecture of a wireless communications system in accordance with an aspect of the disclosure.

FIG. 2 illustrates a high-level system architecture of a wireless communications system 200 in accordance with an aspect of the disclosure. FIG. 2 illustrates various user devices, such as a smart phone 210, a tablet computer 220, a smart television 230, and a laptop or netbook 240, connected to an air interface 108. The air interface 108 is a WLAN, such as a Wi-Fi network, as described with reference to FIG. 1. The smart phone 210, tablet computer 220, smart television 230, and laptop 240 may communicate with each other and/or access the Internet 175 over the air interface 108. Additionally, one or more of the smart phone 210, tablet computer 220, smart television 230, and laptop 240 may communicate directly with each other as peer devices over the air interface 108, or over short-range radio signals, such as Bluetooth signals.

Figure 3:
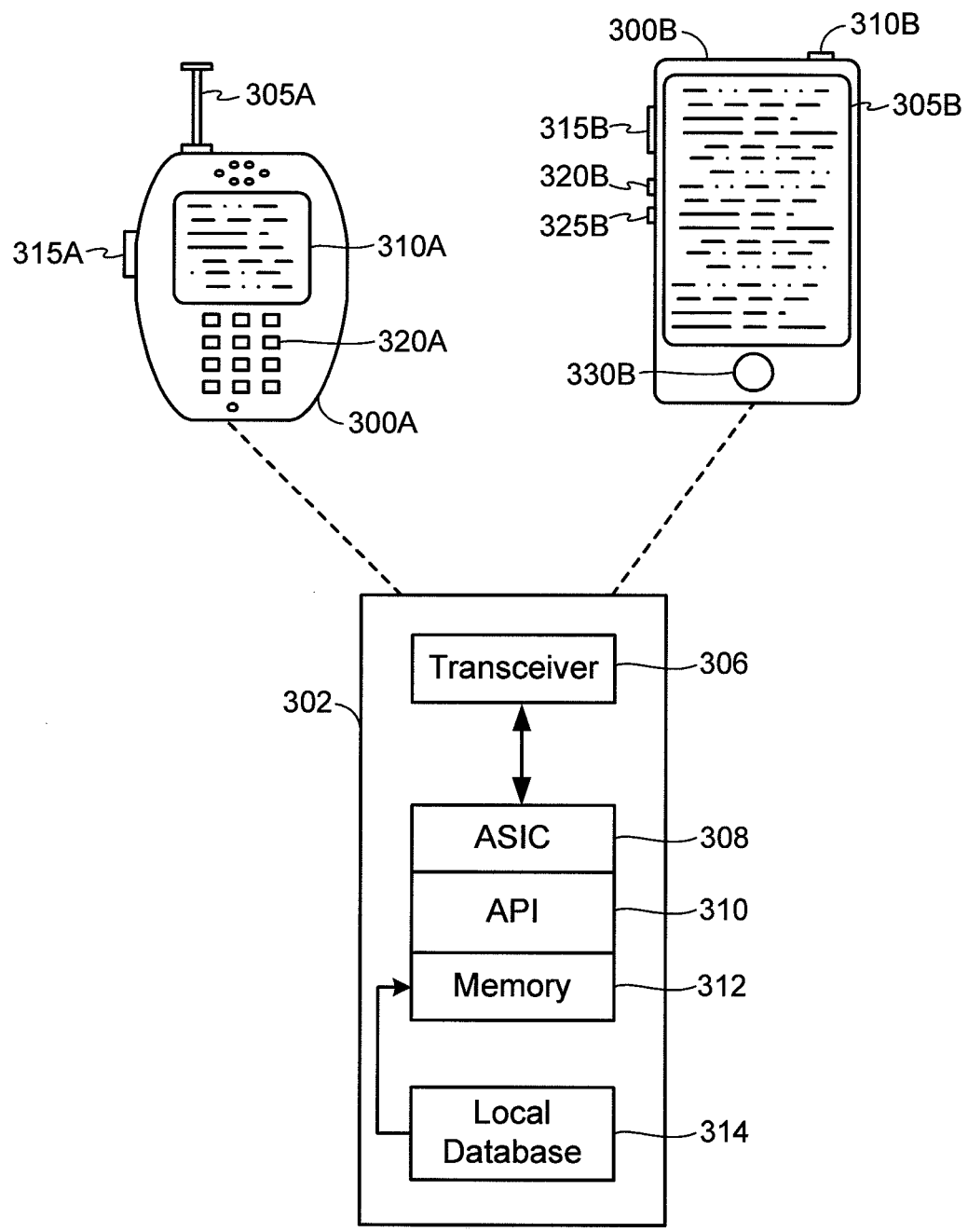
FIG. 3 illustrates examples of user equipments (UEs) in accordance with aspects of the disclosure.

FIG. 3 illustrates examples of UEs in accordance with aspects of the disclosure. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only memory (ROM) or random-access memory (RAM), electrically erasable programmable ROM (EEPROM), flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the disclosure is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 4:
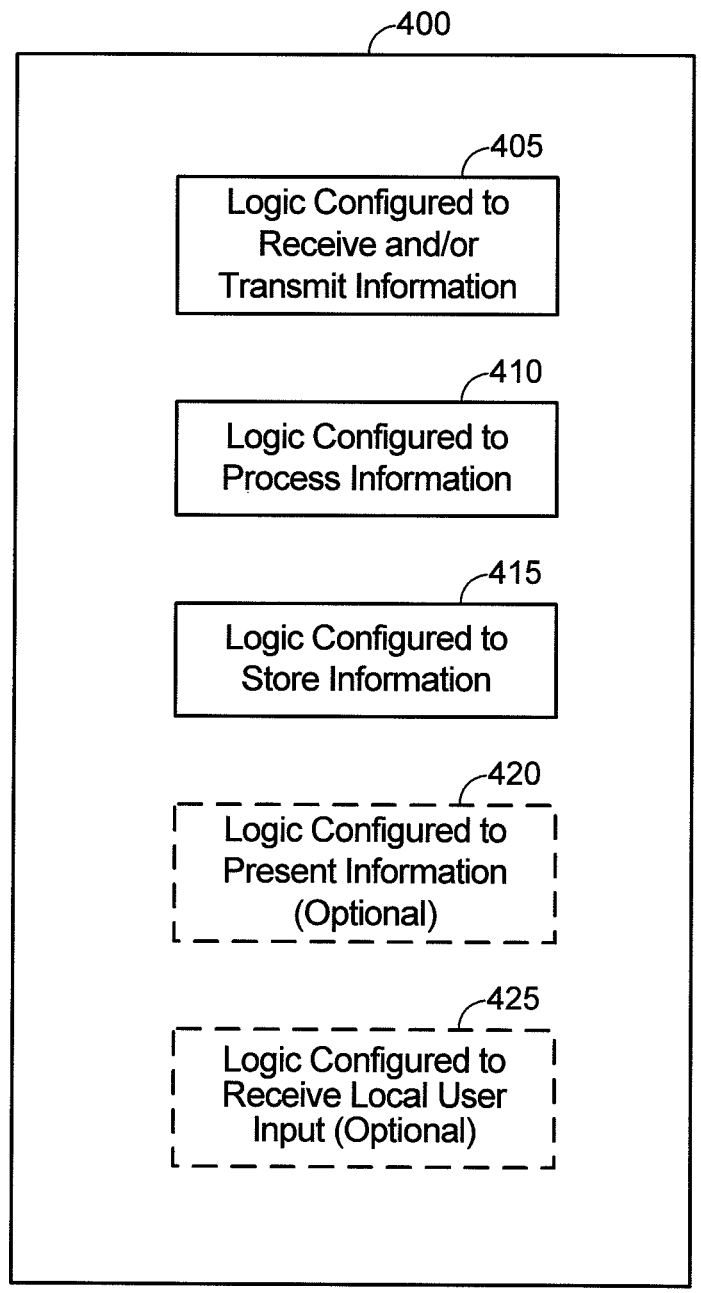
FIG. 4 illustrates a communication device that includes logic configured to perform functionality in accordance with an aspect of the disclosure.

FIG. 4 illustrates a communication device 400 that includes logic configured to perform functionality. The communication device 400 can correspond to any of the above-noted communication devices, including but not limited to UEs 300A or 300B, any component of the RAN 120, any component of the core network 140, any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., the application server 170), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). In an aspect, the logic configured to receive and/or transmit information 405 may include logic configured to discover one or more other devices in a device network, logic configured to monitor one or more conditions associated with the device network to identify a triggering condition that occurs within the device network, and/or logic configured to detect an occurrence of the triggering condition. The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. The logic configured to process information 410 may include logic configured to monitor one or more conditions associated with the device network to identify a triggering condition that occurs within the device network and logic configured to perform an action associated with the triggering condition. The processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM, flash memory, ROM, erasable programmable ROM (EPROM), EEPROM, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

User devices, such as cell phones, smart phones, tablet computers, personal computers, laptops, smart televisions, personal digital assistants, and the like, are increasingly able to interact with each other. User devices may communicate with each other on a peer-to-peer basis over a common local area network. For example, a smart phone, a smart television, and a tablet computer may communicate with each other on a user's home Wi-Fi network. Alternatively, user devices connected to different networks may communicate with each other via a server with access to each of the different networks.

Currently, interactions between user devices are constrained by the limitations set by programmers. Typically, in order for user devices to communicate with each other, the user devices typically must have applications developed by the same programmer installed. A user might want to have two user devices communicate, but because they do not both have a specific application installed, the user devices are only able to perform a limited set of actions. Similarly, a user will often want to do something with an existing application that is different from its capabilities in some way.

There are numerous examples of user devices interacting in a strictly predetermined manner. For example, two user devices can transfer files over Bluetooth when both devices have a Bluetooth file sharing application installed. As another example, a number of users can play the same game on their respective user devices when each user device has the same game installed and the same communication abilities. As yet another example, a video can be streamed from a smart phone to a smart television when both devices have been explicitly programmed to support this interaction.

Accordingly, aspects of the disclosure allow devices to interact with each other in a user or device-determined (rather than programmer-determined) manner.

As an example, when a user wants to stream a video from his or her smart phone, such as smart phone 210, to a smart television, such as smart television 230, there is a question of which device initiates the transfer. One option is for the smart phone 210 to send the video stream to the smart television 230. In this scenario, the smart phone 210 determines that there is another screen available with better resolution or other quality metrics, i.e. the smart television 230. As a result, the smart phone 210 sends the video to the smart television 230.

A second option is for the smart television 230 to request the video stream from the smart phone 210. In this scenario, the smart television 230 sends out a request to receive a video, the smart phone 210 receives the request, and responds with a video. The smart phone 210 may select the video based on user interaction or based on criteria from the smart television 230.

A third option is that the network has a "collective consciousness," where each user device makes decisions based on past interactions with other user devices. In this scenario, neither device owns the entire decision making process. In a Collective Consciousness Network, user devices "recruit" other devices to an activity. The recruiting process involves a user device advertising what it is doing, or what it would like to do. Networked devices that are able to assist in the experience voluntarily join.

Collective Consciousness Networks provides the possibility for users to use their devices in ways that programmers did not explicitly develop. However, since the devices have not been directly told what to do, they must explore various options, possibly erring, before arriving at and providing the desired experience.

Figure 5:
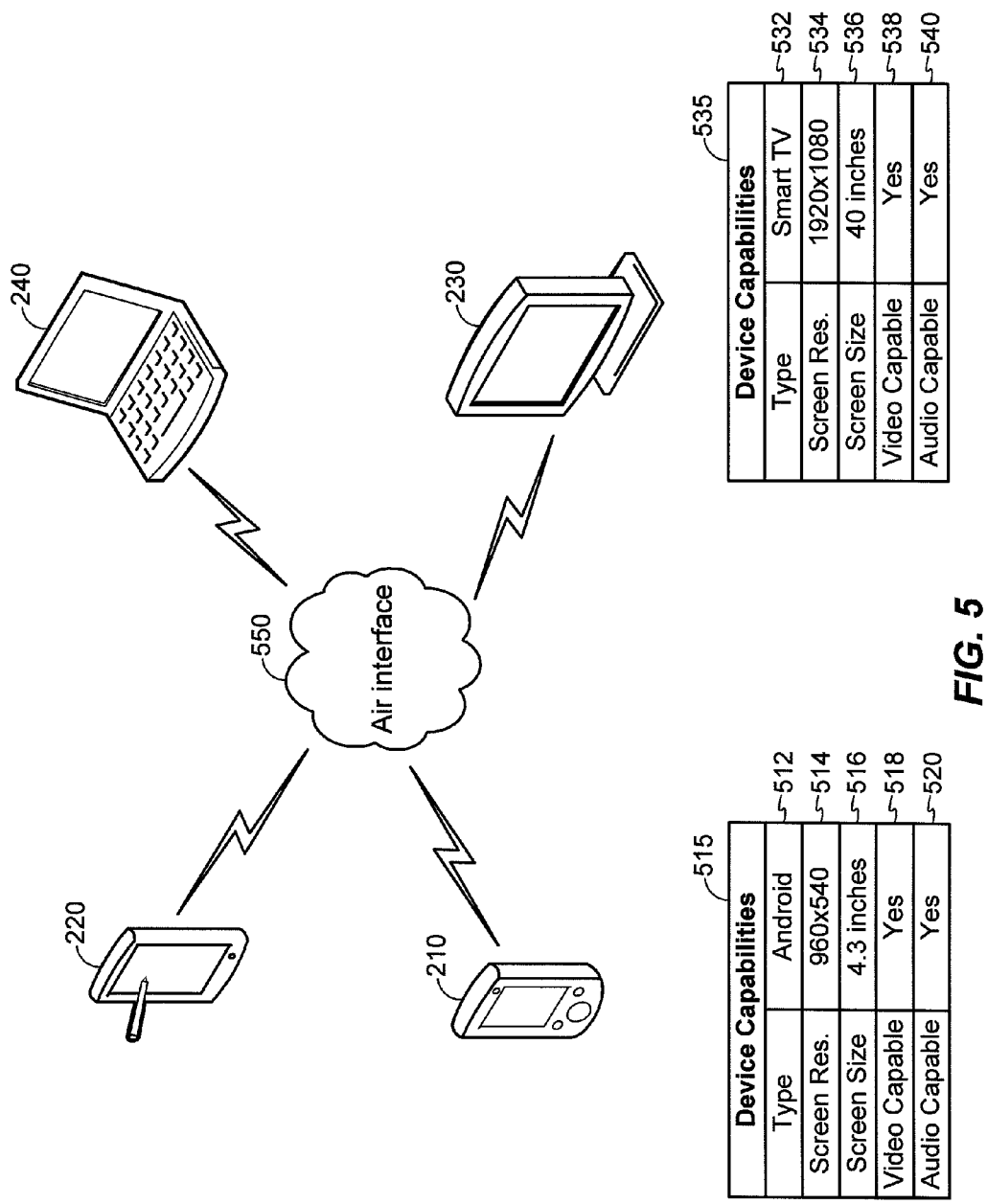
FIG. 5 illustrates an exemplary network of devices capable of communicating with each other over an air interface.

FIG. 5 illustrates an exemplary network of devices capable of communicating with each other over an air interface 550. In the example of FIG. 5, the user begins an activity on the smart phone 210, such as watching a video. The video may be stored as a media file on the smart phone 210 or streamed to the smart phone 210 over the air interface 550. The air interface 550 may be a WLAN or a wireless personal area network (WPAN).

When the smart phone 210 begins playing the video, it can send out a message to other devices on the air interface 550, such as tablet computer 220, smart television 230, and laptop 240, notifying them that it is playing a video. The notice can also be or include an invitation for another device to play the video instead. In response, one or more (or none) of the various devices may "volunteer" to play the video. The devices may volunteer if they are not doing anything else and if they are equipped to perform the particular activity, here playing a video. The devices can volunteer by sending the smart phone 210 their capabilities and letting the smart phone 210 decide whether or not to pass off performing the activity to another device.

In the example of FIG. 5, the smart television 230 volunteers to play the video, and the smart phone 210 can decide whether or not to send the video to the smart television 230. The smart phone 210 can compare its capabilities to the capabilities of the smart television 230 to see which device is better equipped to play the video and/or ask the user if he or she wishes to send the video to the smart television 230. If the smart phone 210 decides to have the smart television 230 play the video, it can stream the video to the smart television 230 or instruct the source of the video stream to stream the video to the smart television 230 instead.

FIG. 5 illustrates device capability tables 515 and 535 for the smart phone 210 and smart television 230, respectively. The smart phone 210 and the smart television 230 can send each other these tables when communicating. Table 515 includes the type of smart phone 512, the screen resolution 514, the screen size 516, whether or not it is capable of playing video 518, and whether or not it is capable of playing audio 520. Likewise, table 535 includes the type of television 532, the screen resolution 534, the screen size 536, whether or not it is capable of playing video 538, and whether or not it is capable of playing audio 540. These are merely examples of the information that can be included in device capability tables, and the disclosure is not limited to these examples.

In an alternative aspect, a third-party server, such as the access point for the WLAN or WPAN, such as access point 125, or one of the devices communicating over air interface 550 (i.e. smart phone 210, tablet computer 220, smart television 230, and laptop 240) may act as a broker for the network. In this aspect, the smart phone 210 notifies the broker that it is performing an activity, here playing a video, and the broker notifies the other devices on the air interface 550 instead of the smart phone 210 doing so. Any devices that volunteer to play the video notify the broker, which then decides whether or not to have a different device play the video. The broker notifies the smart phone 210 that another device will play the video, and instructs the smart phone 210 to send the video to the other device if the video is stored on the smart phone 210. If the video is being streamed to the smart phone 210, the broker instructs the source of the video to stream it to the other device.

In this aspect, each device may send its capability table to the broker when the air interface 550 is setup or when a device joins the network of devices, or the broker may request the device capability tables when it receives notice of a new activity being performed. The broker can use the capability tables to determine if a volunteering device would be better suited to perform the current activity. Alternatively, rather than the devices volunteering to perform a given activity, the broker can use the device capability tables to determine which device would be best at performing the activity and assign the activity to that device. In that case, the broker may or may not first notify the devices that a new activity is available to be performed.

Accordingly, the various aspects of the disclosure allow users to use their devices as they wish, without requiring an application for each desired experience. Rather than requiring an application to perform the functionality described herein, various modules are provided. Each module need only reside on one device. Each module can be used in various ways, since each module is only one part of the total user experience. This allows the user greater flexibility in achieving a desired result. It also allows fewer blocks to be used in a greater number of ways.

Additionally, the networks described herein can have a learning ability. The learning ability enables networks to intuit a user's needs. This is important since the user's needs might not be obvious, and the ad hoc network might have to guess before arriving at the desired experience.

The modules can be used by the devices to discover each other's presence on a common communication network, such as a WLAN or a WPAN. The devices can automatically discover each other when they connect to the communication network. Connected devices can also periodically poll the network to determine what other devices are connected in case a device disconnects or did not announce itself when it connected. After discovery, the devices can exchange device capability messages. For example, a first device can be a heart rate monitor that has a device capability of monitoring a user's heart rate, a second device can be a smart television that has device capabilities of outputting audio and video data, a third device can be a music player, such as an MP3 player, that has the device capability of outputting audio data, and so on.

Once the devices discover each other, they become a network of devices with a particular network configuration. For example, a first network configuration may be the combination of a heart rate monitor and music player, a second network configuration may be the combination of a music player, a heart rate monitor, a treadmill, and a Bluetooth headset, a third network configuration may be the combination of a smart phone, a smart television, and a laptop, and so on.

Once a particular network configuration has been established, the user can establish rules that govern the actions performed by one or more of the devices that form that network configuration. Alternatively, the modules can define the actions the one or more devices should take in various situations. In yet another alternative, the devices themselves may determine which actions to take.

The following are examples of operating environments, network configurations, triggering conditions, and actions that illustrate these various aspects:

1. Operating environment: A user running on a treadmill listening to a music player and wearing a heart rate monitor.
   Network configuration: Bluetooth-enabled MP3 player, Bluetooth-enabled treadmill, and Bluetooth-enabled heart rate monitor.
   Triggering condition(s): The heart rate monitor detects that the user's heart rate rises above a threshold while the treadmill is on, and/or the treadmill has been on for a certain period of time.
   Action(s): Raise or lower the volume on the MP3 player, switch to a particular song or genre of music on the MP3 player, and/or lower the speed of treadmill.

In the first operating environment, the triggering condition(s) and the associated action(s) can be identified in different ways. The devices can passively log events (i.e. triggering conditions) and actions performed by the user and then preemptively perform the actions when the devices detect the triggering conditions. In this case, the user may have a history of adjusting the volume, playing a certain song, and/or playing a certain genre of music when the user's heart rate rises above a threshold and/or after a certain period of time on the treadmill. The devices can generate a set of rules that define the triggering conditions and corresponding actions based on the log.

It may not always be clear which actions the user would prefer to have the network devices perform upon certain triggering conditions, or even what the exact triggering conditions are. This may be because the user performs different acts based on the same triggering conditions, or because there is not a sufficient history of user interaction with the device network. In this case, the devices can experiment with different actions and different triggering conditions. The user can provide feedback to the network devices that indicates whether this was an appropriate action. In the first operating environment, the feedback can include changing the song and/or volume on the MP3 player and/or changing the speed of the treadmill if the user is not satisfied with the devices' chosen actions. The devices can log this user intervention and update the set of rules accordingly.

Alternatively, the user or a module installed on the user device can specify the set of rules. The user can explicitly define the triggering condition(s) and/or action(s). To do this, the user can be presented with the capabilities of the various devices in the network configuration, and can configure the actions to be performed when the triggering conditions occur. If the set of rules are provided by a module, the set of rules may still not be perfect for the particular user, and the module can modify the rules based on user feedback.

2. Operating environment: A user is using his or her smart phone in a room with a smart television.
   Network configuration: Wi-Fi-enabled smart phone and Wi-Fi-enabled smart television.
   Triggering condition(s): The smart television is on and the user has initiated play of a video on the smart phone.
   Action(s): The smart phone detects that the smart television is on, analyzes the smart television's published device capabilities, determines that the smart television has a larger screen size than the smart phone, and streams the video to the smart television. Alternatively, the smart phone notifies the smart television that it is playing a video and in response, the smart television analyzes the smart phone's published device capabilities, determines that it has a larger screen size than the smart phone, requests that the smart phone stream the video to the smart television, and plays the video.

In an aspect, the specific triggering conditions can be related to the corresponding actions based on a common domain. In the first operating environment, for example, a heart rate change can trigger a song to be played with a tempo that is commensurate with that heart rate change. In this example the common domain is "time," or more specifically, "tempo." That is, a rate increase on one device can trigger a rate increase on another device. In the second operating environment, the common domain could be video, insofar as playing a video causes a video streaming and output action in response.

The common domain can also be space-related, such as relative positions on X-Y-Z axes. That is, the relative positions of the devices in the device network can be part of a triggering condition. That way, for example, the music player being in a particular position relative to the treadmill indicates that the user is physically on the treadmill and not just walking by the treadmill.

Figure 6:
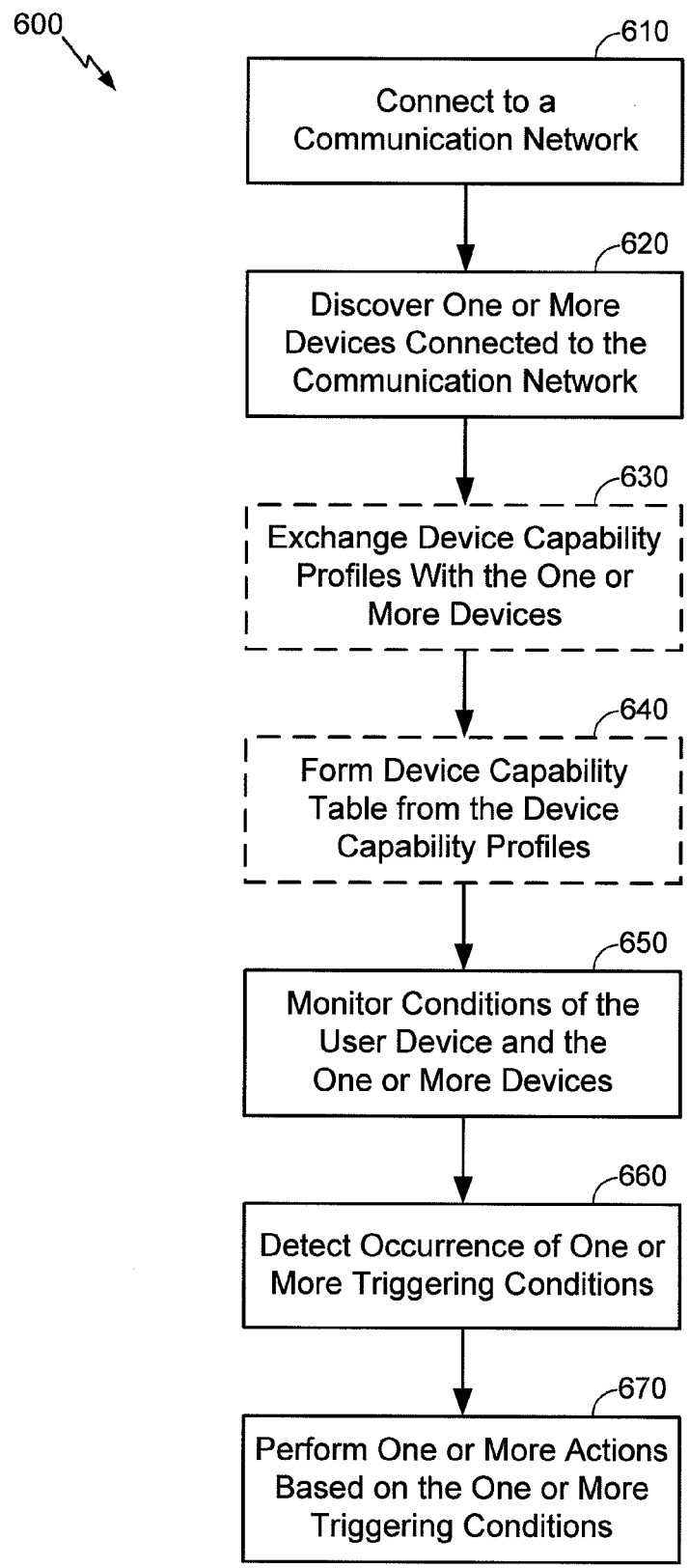
FIG. 6 illustrates an exemplary flow performed by a user device according to an aspect of the disclosure.

FIG. 6 illustrates an exemplary flow 600 performed by a user device according to an aspect of the disclosure. At 610, the user device connects to a communication network, such as a WLAN or WPAN. At 620, the user device discovers one or more other devices connected to the communication network. The user device may discover the other devices immediately after connecting to the network and/or may periodically discover any other devices on the network.

At 630, the user device sends its device capability profile to the other devices on the network and requests that those devices send it their capability profiles. At 640, the user device builds a device capability table, or network configuration table, of the devices on the network and their respective capabilities based on the received device capability profiles. Aspects 630 and 640 are optional, as the user device can perform the remaining aspects of exemplary flow 600 without this information, as described below.

At 650, the user device passively monitors conditions of itself and the other network devices. The user device can use this information to identify one or more triggering conditions that cause a given action to occur in itself and/or the one or more other devices on the network. Examples of triggering conditions include a heart rate monitor detecting a heart rate over a threshold, a smart phone playing a video, and so on. Examples of corresponding actions include the music player switching to a different song or increasing the volume, the smart phone sending the video to a smart television, and so on. Monitoring these conditions and actions does not require the network devices to have exchanged device capability profiles.

The user device can create a set of rules based on the monitored conditions and actions. Alternatively, the user or third party can supply such rules. In that case, at 650, the user device simply monitors the conditions of the user device and network devices to determine when a rule is triggered. This alternative may require the device capability table if the rules require knowledge of the other devices' capabilities.

At 660, the user device detects an occurrence of one or more identified triggering conditions. The triggering condition(s) may occur at the user device, or the user device may receive a notification that a triggering condition has occurred at one of the other network devices. The notification may be a message that the triggering condition has occurred, a request to perform an action based on the occurrence of the triggering condition, or receipt of data to process based on the occurrence of the triggering condition. For example, where the user device is a smart television and the triggering condition is the user playing a video on a smart phone, the notification may be nothing more than the smart television receiving a stream of the video to play.

At 670, the user device performs the action(s) associated with the triggering condition(s). Where the actions are not fully defined, the user device can use the device capability profiles or device capability table to "guess" at an appropriate action. For example, if the user device is a smart phone and it has the device capability information for a smart television, it may guess that it would be better for the user to watch a video on the smart television. Accordingly, it will stream the video to the smart television.

Alternatively, if the user device does not have the device capability profiles or table, it can ask the other network devices to "volunteer" to perform the triggered action. The user device may send its capability profile, possibly only including the relevant capabilities, with the request so that the other devices can compare their capabilities to determine if they would be better at performing the action. If one or more devices volunteer to perform the action, the user device will select the best device, notify it that it may perform the action, and send it the information necessary to perform the action.

When devices need to make decisions regarding how to interact with each other, their initial decisions may not be accurate. It is therefore necessary to track interactions and rate them based on levels of success. This allows the devices to reference their history and factor past interactions into future experiences. For example, when a smart phone streams a video to the device network and the smart television receives and plays the video through to the end, the devices learn that this was a "good" decision. The device network can now factor in this "good" decision when similar factors are in place and future decisions are required. Conversely, if the user stops the video or turns off the television, the device network learns that this was a "bad" decision and will try different device interactions in the future.

It can take time for a device network to develop a sufficient history of interactions to know how the devices should work together. If the device network has to use only the trial and error learning method, it could be discouraging to users, preventing them from taking full advantage of the system.

Device networks are location-based and therefore there could be many similar networks in various locations around the world. Similar networks provide for similar needs. Therefore, successful interactions in Network "A" can be applied to Network "B," if Network "A" and Network "B" contain similar devices.

To help jump start the learning process, as devices in disparate device networks learn, they can share that knowledge with a global "collective consciousness" server. The server stores the individual learned experiences as well as data about the device networks that performed the learning. Other device networks can download a "learned history" from the server that is relevant to that particular device network. The server can determine a relevant learned history for a device network based on similarities between the device network and the stored histories as well as similarities between the respective users. "Similar" networks would be networks with the same or similar devices and the same or similar device capabilities that can perform the same interactions. For example, two device networks comprising a smart phone, a smart television, and a tablet computer would be considered similar to each other, even if the brands of the devices are different, if they can perform the same interactions. Or, to the extent that they can perform the same interactions as another device network comprising a smart phone, a smart television, and a tablet computer, they are considered similar to that device network.

The server is needed to track, organize, group, and distribute these learned experiences. Each device network's interactions can be sent to the server. The server organizes and groups the interactions of the device networks. When a similar device network is established, the new network can request a history from the servers to effectively jumpstart the learning process. Once the stored history is shared with the new network, the new network is better able to make decisions.

Figure 7:
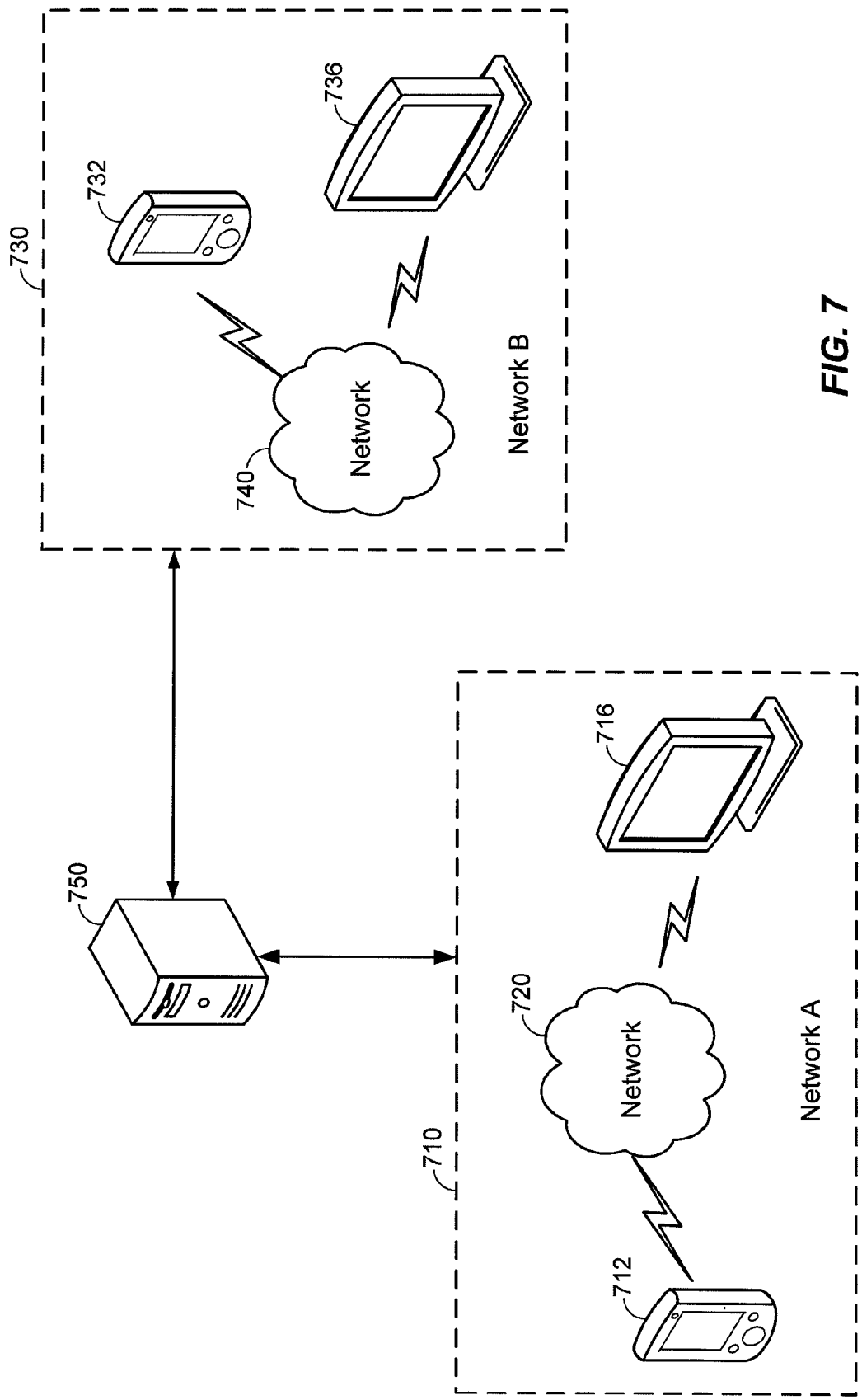
FIG. 7 illustrates a high-level system architecture of a wireless communications system in accordance with an aspect of the disclosure.

FIG. 7 illustrates a high-level system architecture of a wireless communications system in accordance with an aspect of the disclosure. A Network A 710 comprises a smart phone 712 and a smart television 716 connected over a network 720. A Network B 730 also comprises a smart phone 732 and a smart television 736 connected over a network 740. There may be many other networks, and many different devices, however for simplicity, only networks 710 and 730 are illustrated.

The smart phones 712 and 732 and the smart televisions 716 and 736 need not be the same make and model, or even the same brand, depending on the types of interaction. For instance, if the interaction is something that all smart phones and smart televisions can do, then the particular make and model is irrelevant. However, if the interaction is something that only that make and model can perform, or can only perform with other devices of the same make and model, then that information is relevant.

A server 750 is in communication with Network A 710 and Network B 730. Server 750 stores information about networks 710 and 720, such as the types and capabilities of the devices in each network and historical information regarding their interaction. The server determines the capabilities of each device and thus the device network, and matches device networks that have the same capabilities. The server can receive the capability information from the device network itself or from third-party sources. The server can share history information among networks with matching capabilities.

Figure 8:
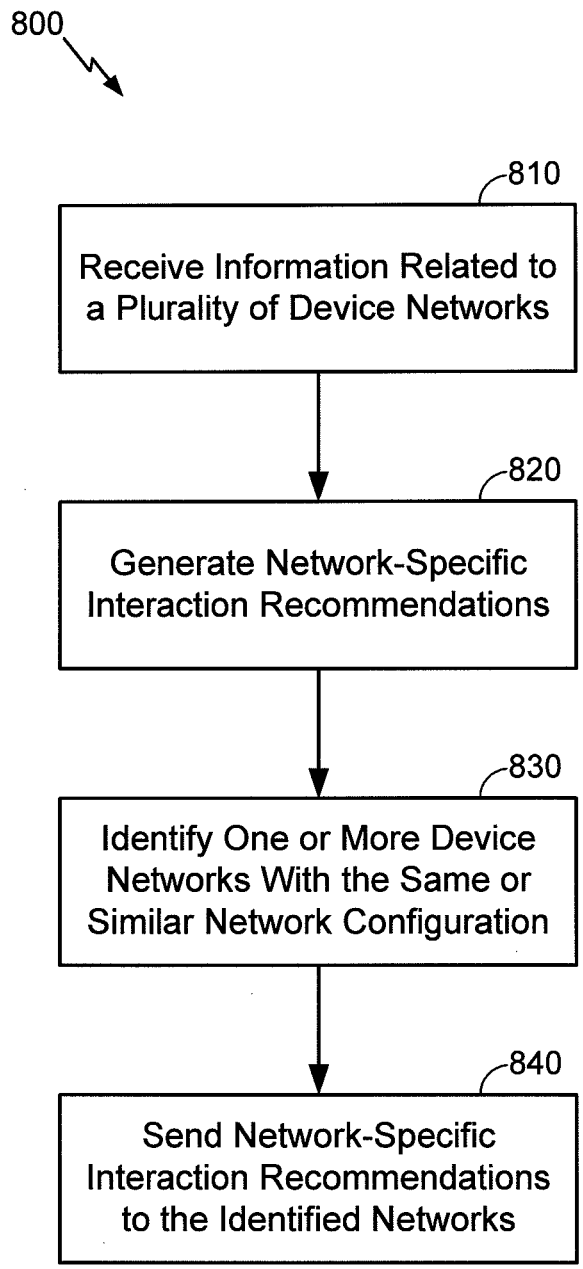
FIG. 8 illustrates an exemplary flow performed by a user device according to an aspect of the disclosure.

FIG. 8 illustrates an exemplary flow 800 performed by a server, such as server 750, according to an aspect of the disclosure. In the exemplary flow 800, the server implements an iterative learning algorithm to produce device interaction recommendations based on past interactions between devices in networks with similar network configurations.

At 810, the server receives information related to a plurality of different device networks, such as device networks 710 and 730. Each of the plurality of device networks includes a plurality of different devices. Each device has an associated set of device capabilities. The aggregation of device capabilities across the devices in the network provides the capabilities of the network.

The information the server receives from the different device networks also includes an interaction history between the device network's plurality of devices. The history can include actions taken, events that triggered the actions, and user feedback to the actions. The server can determine if there are any compatibility requirements to perform these actions, such as whether the devices must be the same make and model, the same brand, have the same software installed, and the like.

At 820, the server generates at least one set of network-specific interaction recommendations that other networks with that network configuration and/or network capabilities can use to improve their decision making. The server identifies networks that have the same or similar devices with the same or similar capabilities and aggregates, into a set of network-specific interaction recommendations, at least a portion of the interaction histories of the identified device networks.

At 830, the server identifies one or more target device networks that have the same or similar network configuration as a network for which the server generated network-specific interaction recommendations. The server may identify the target device network based on receiving a request for network-specific interaction recommendations from the target network. Alternatively, the server may identify the device networks from which it has received information and which have the same or similar network configuration and send them the recommendations.

A target device network has the same or similar network configuration if it has a network configuration that matches the network configuration of a network for which the server generated network-specific interaction recommendations. Network configurations match if the number and type of devices in the two network are the same, if the make and model of the corresponding devices in the two networks are the same, if the operating systems of the corresponding devices in the two networks are the same, if the feature set (e.g. video-capable, audio-capable, etc.) of the corresponding devices in the two networks are the same, if the devices in the two networks are capable of performing the same actions, and/or the like.

At 840, the server sends the particular set of network-specific interaction recommendations to the one or more target devices within the target device network based on the identification. The one or more device networks use the set of interaction recommendations to make decisions regarding interactions among the one or more target devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a first device configured to communicate with one or more other devices, comprising:
    discovering, by the first device, the one or more other devices, wherein the first device and the one or more other devices form a device network;
    exchanging, by the first device, device capability profiles between the first device and the one or more other devices;
    forming, by the first device, a device capability table at the first device for the device network based on the exchanged device capability profiles;
    monitoring, by the first device, one or more conditions associated with the device network to identify a triggering condition that occurs within the device network, wherein the triggering condition is associated with one or more actions to be performed by the device network;
    detecting, by the first device, an occurrence of the triggering condition; and
    in response to the detecting, performing, by the first device, an action associated with the triggering condition based on the device capability table for the device network,
    wherein the action associated with the triggering condition comprises a request that at least one of the one or more other devices volunteer to perform a second action associated with the triggering condition, and
    wherein at least one of the one or more other devices volunteers to perform the second action by sending the first device a capability profile of the at least one of the one or more other devices, and wherein the first device decides whether to pass off performance of the second action to the at least one of the one or more other devices based on the capability profile of the at least one of the one or more other devices.

2. The method of claim 1, wherein the first device and the one or more other devices are connected to a communication network.

3. The method of claim 2, wherein the communication network is a wireless local area network (WLAN) or a wireless personal area network (WPAN).

4. The method of claim 2, wherein the discovering is performed when the first device connects to the communication network.

5. The method of claim 2, wherein the discovering is performed periodically after the first device connects to the communication network.

6. The method of claim 1, wherein the first device and the one or more other devices form the device network without user action.

7. The method of claim 1, wherein the triggering condition is specified in a set of rules.

8. The method of claim 7, wherein the set of rules is received from a user.

9. The method of claim 7, wherein the first device generates the set of rules based on the monitoring.

10. The method of claim 1, wherein the one or more conditions include an event at one of the one or more other devices.

11. The method of claim 1, wherein the association between the triggering condition and the one or more actions is a common domain.

12. The method of claim 11, wherein the common domain is a time and/or space domain.

13. The method of claim 1, wherein the action associated with the triggering condition comprises a notification to at least one of the one or more other devices that the triggering condition occurred.

14. The method of claim 1, wherein the request includes a device capability profile of the first device.

15. The method of claim 14, wherein the one or more other devices compare the device capability profile to their own device capability profiles in order to decide whether or not to volunteer to perform the second action associated with the triggering condition.

16. The method of claim 1, further comprising:
    receiving a response from at least one of the one or more other devices indicating that the at least one of the one or more other devices will perform the second action associated with the triggering condition.

17. The method of claim 1, wherein the triggering condition is an act performed by a user of the first device.

18. The method of claim 1, wherein the triggering condition is an input to the first device exceeding a threshold.

19. An apparatus for operating a first device configured to communicate with one or more other devices, comprising:
    a transceiver of the first device; and
    at least one processor of the first device coupled to the transceiver and configured to:
        discover the one or more other devices, wherein the first device and the one or more other devices form a device network;
        exchange device capability profiles between the first device and the one or more other devices;
        form a device capability table at the first device for the device network based on the exchanged device capability profiles;
        monitor one or more conditions associated with the device network to identify a triggering condition that occurs within the device network, wherein the triggering condition is associated with one or more actions to be performed by the device network;
        detect an occurrence of the triggering condition; and
        perform, in response to detection of the occurrence of the triggering condition, an action associated with the triggering condition based on the device capability table for the device network,
        wherein the action associated with the triggering condition comprises a request that at least one of the one or more other devices volunteer to perform a second action associated with the triggering condition, and wherein at least one of the one or more other devices volunteers to perform the second action by sending the first device a capability profile of the at least one of the one or more other devices, and wherein the at least one processor decides whether to pass off performance of the second action to the at least one of the one or more other devices based on the capability profile of the at least one of the one or more other devices.

20. The apparatus of claim 19, wherein the first device and the one or more other devices are connected to a communication network.

21. The apparatus of claim 20, wherein the communication network is a wireless local area network (WLAN) or a wireless personal area network (WPAN).

22. The apparatus of claim 20, wherein the at least one processor being configured to discover comprises the at least one processor being configured to perform the discovery when the first device connects to the communication network.

23. The apparatus of claim 20, wherein the at least one processor being configured to discover comprises the at least one processor being configured to perform the discovery periodically after the first device connects to the communication network.

24. The apparatus of claim 19, wherein the first device and the one or more other devices form the device network without user action.

25. The apparatus of claim 19, wherein the triggering condition is specified in a set of rules.

26. The apparatus of claim 25, wherein the set of rules is received from a user.

27. The apparatus of claim 25, wherein the first device generates the set of rules based on monitoring the one or more conditions associated with the device network.

28. The apparatus of claim 19, wherein the one or more conditions include an event at one of the one or more other devices.

29. The apparatus of claim 19, wherein the association between the triggering condition and the one or more actions is a common domain.

30. The apparatus of claim 29, wherein the common domain is a time and/or space domain.

31. The apparatus of claim 19, wherein the action associated with the triggering condition comprises a notification to at least one of the one or more other devices that the triggering condition occurred.

32. The apparatus of claim 19, wherein the request includes a device capability profile of the first device.

33. The apparatus of claim 32, wherein the one or more other devices compare the device capability profile to their own device capability profiles in order to decide whether or not to volunteer to perform the second action associated with the triggering condition.

34. The apparatus of claim 19, wherein the at least one processor is further configured to:
receive, in conjunction with the transceiver, a response from at least one of the one or more other devices indicating that the at least one of the one or more other devices will perform the second action associated with the triggering condition.

35. The apparatus of claim 19, wherein the triggering condition is an act performed by a user of the first device.

36. The apparatus of claim 19, wherein the triggering condition is an input to the first device exceeding a threshold.

37. An apparatus operating a first device configured to communicate with one or more other devices, comprising:

means for discovering the one or more other devices, wherein the first device and the one or more other devices form a device network;
means for exchanging device capability profiles between the first device and the one or more other devices;
means for forming a device capability table at the first device for the device network based on the exchanged device capability profiles;
means for monitoring one or more conditions associated with the device network to identify a triggering condition that occurs within the device network, wherein the triggering condition is associated with one or more actions to be performed by the device network;
means for detecting an occurrence of the triggering condition; and
means for performing, in response to detection of the occurrence of the triggering condition, an action associated with the triggering condition based on the device capability table for the device network,
wherein the action associated with the triggering condition comprises a request that at least one of the one or more other devices volunteer to perform a second action associated with the triggering condition, and
wherein at least one of the one or more other devices volunteers to perform the second action by sending the first device a capability profile of the at least one of the one or more other devices, and wherein the first device decides whether to pass off performance of the second action to the at least one of the one or more other devices based on the capability profile of the at least one of the one or more other devices.

38. A non-transitory computer-readable medium for operating a first device configured to communicate with one or more other devices, comprising:
at least one instruction to cause the first device to discover the one or more other devices, wherein the first device and the one or more other devices form a device network;
at least one instruction to cause the first device to exchange device capability profiles between the first device and the one or more other devices;
at least one instruction to cause the first device to form a device capability table at the first device for the device network based on the exchanged device capability profiles;
at least one instruction to cause the first device to monitor one or more conditions associated with the device network to identify a triggering condition that occurs within the device network, wherein the triggering condition is associated with one or more actions to be performed by the device network;
at least one instruction to cause the first device to detect an occurrence of the triggering condition; and
at least one instruction to cause the first device to perform, in response to detection of the occurrence of the triggering condition, an action associated with the triggering condition based on the device capability table for the device network,
wherein the action associated with the triggering condition comprises a request that at least one of the one or more other devices volunteer to perform a second action associated with the triggering condition, and
wherein at least one of the one or more other devices volunteers to perform the second action by sending the first device a capability profile of the at least one of the one or more other devices, and wherein the first device decides whether to pass off performance of the second action to the at least one of the one or more other devices based on the capability profile of the at least one of the one or more other devices.

* * * * *